UNITED STATES PATENT OFFICE.

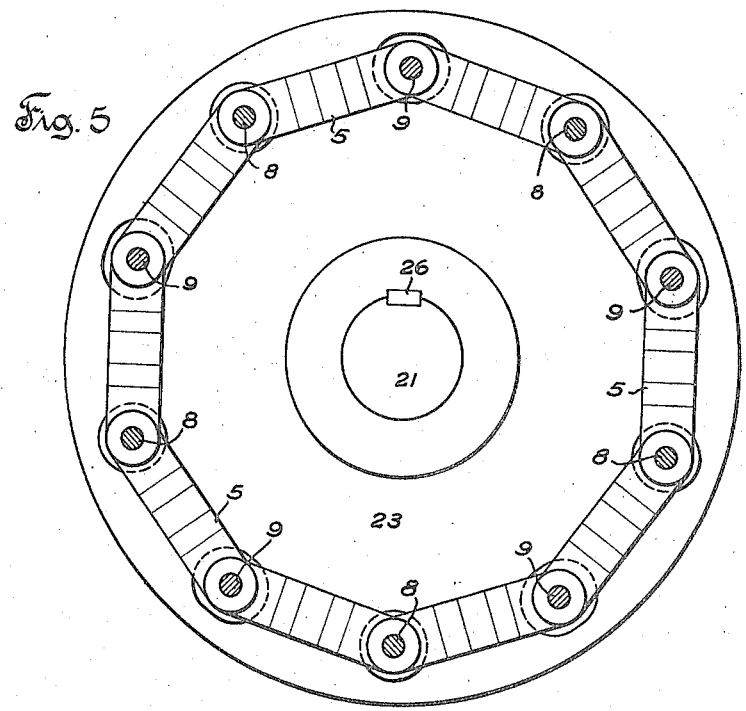
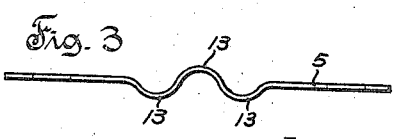
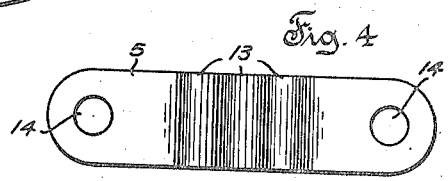
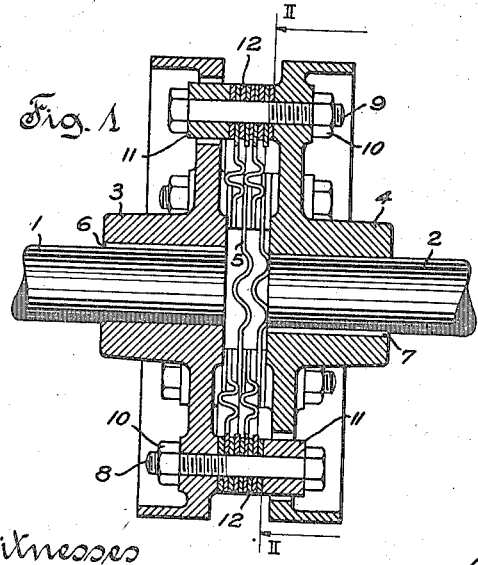
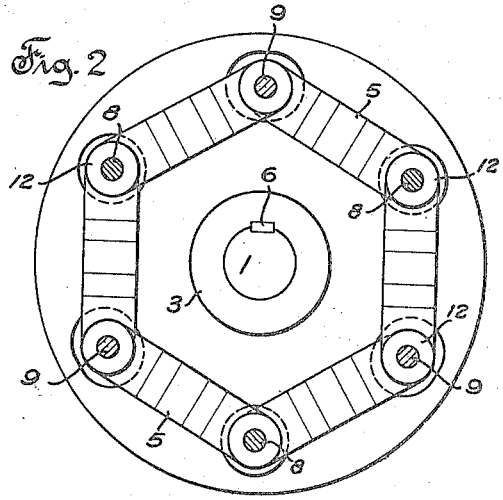

WILLIAM H. LIEBER, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE.

SHAFT-COUPLING.

1,145,602. Specification of Letters Patent. Patented July 6, 1915.

Application filed December 8, 1913. Serial No. 805,868.

*To all whom it may concern:*

Be it known that I, WILLIAM H. LIEBER, a citizen of the United States, residing at Milwaukee, in the county of Milwaukee and State of Wisconsin, have invented a certain new and useful Improvement in Shaft-Couplings, of which the following is a specification.

This invention relates to improvements in the construction of couplings for transmitting power from one shaft to another and which will permit effective driving of one shaft by another even though the shafts are not in perfect alinement.

An object of the invention is to provide a shaft coupling which is simple in construction and which will permit effective driving of one shaft by another although the shafts may not be in perfect alinement.

Some of the more specific objects of the invention may be enumerated as follows: First, to provide a coupling in which maximum strength is procured at minimum cost. Second, to provide a coupling which may be utilized to transmit power in either direction of rotation. Third, to provide a coupling in which similar parts are made interchangeable. Fourth, to provide a power transmitting means or link which may be utilized in couplings of various sizes. Fifth, to provide a power transmitting means or link which will not readily deteriorate due to its subjection to moisture.

Couplings similar to that disclosed in the present application, but utilizing flat links composed of leather or similar substance, instead of the corrugated spring links herein disclosed, have heretofore been placed in extensive use; but such couplings have proven objectionable due to stretching and general deterioration of the leather links when the couplings were employed in places where these links were subjected to moisture. The leather links in order to transmit suitable power were also of necessity made very thick and of considerable size. Owing to the high cost of suitable leather for the formation of these leather links, the cost of manufacture of such a coupling for transmitting high powers is prohibitive. With the present invention whereby corrugated spring links made of sheet steel are used in place of leather links heretofore used, the objectionable deterioration of the links due to moisture, as well as the prohibitive cost of construction, are eliminated.

A clear conception of several embodiments of the invention may be had by referring to the drawing accompanying and forming a part of this specification in which like reference characters designate the same or similar parts in the various views.

Figure 1 is a transverse vertical section of a flexible shaft coupling employing a series of links having overlapping ends and arranged in the form of a hexagon. Fig. 2 is a transverse vertical section through the coupling disclosed in Fig. 1, the section being taken along the line II—II of Fig. 1 looking in the direction of the arrows. Fig. 3 is an end elevation of one of the power transmitting corrugated spring links. Fig. 4 is a plan view of one of the power transmitting corrugated spring links. Fig. 5 is a section similar to that disclosed in Fig. 2 of a coupling having links arranged in a closed circuit with overlapping ends to form a decagon.

In order to facilitate description of the invention, the shaft 1 will be designated as the driving shaft, while the shaft 2 will be designated as the driven shaft; but it should be understood that the driving power might just as easily be applied to the shaft 2 without affecting the general operation of the coupling. The driving shaft 1 has a driving coupling member 3 secured to its end by means of a key 6. The driving coupling member 3 is constructed in the form of a disk or flange disposed in a plane at right angles to the axis of the shaft 1 and having an enlarged central boss which is centrally bored for connection to the shaft 1. The driven shaft 2 has a driven coupling member 4 secured to its end by means of the key 7. The construction of the driven coupling member 4 is identical with that of the driving member 3, these members being made interchangeable, and when in position upon their respective shafts 1, 2, being spaced apart. The corrugated spring links 5 are located in the space between the members 3, 4, and are arranged in a closed circuit with overlapping adjacent ends. The links 5 are preferably constructed of a flat spring material such as hard rubber or steel and are provided intermediate their ends with corrugations 13, and at their ends with holes 14. With the coupling assembled, the holes 14 formed in the overlapping adjacent ends of the links 5, register, and have bolts or pivots 8, 9, inserted therein. The overlapping ends of the links 5 are spaced slightly apart by means of washers 12 which may be formed of leather or other suitable material.

Of the series of bolts or pivots 8, 9, the driving pivots 8 are secured at one end to the driving member 3, being locked to said member by means of lock nuts 10, while the driven bolts or pivots 9 are secured at one end to the driven member 4, being secured to said member by means of lock nuts 10. Alternate pivots 8, it will be noted, are fixed to the driving member 3, while the intermediate pivots 9 are fixed to the driven member 4. The bolts or pivots 8, 9, are made of sufficient length so that their free ends pass through elongated openings formed in the members 4, 3, respectively, thereby permitting ready adjustment and manipulation of the bolts or pivots 8, 9 within the members to which they are respectively fixed. The free ends of the bolts or pivots 8, 9, are also provided with collars 11 which coact between the pivot heads and the adjacent link ends.

It will be noted that in the disclosure in Figs. 1 and 2, the corrugated spring links 5 are arranged in a closed circuit with overlapping adjacent ends to form a hexagon, while in Fig. 5 the same size and form of links 5 are utilized in a coupling capable of transmitting considerably more power, the links being arranged in a closed circuit with overlapping adjacent ends to form a decagon. With this form of construction, manufacturers of the couplings need carry but one size of link 5 in stock and may utilize the same for various sized couplings. In the type of coupling disclosed in Fig. 5, the coupling member 23 which is secured to the end of the driving shaft 21 by means of a key 26, is of course again made interchangeable with the coupling member on the driven shaft, not shown. This interchangeable construction of the coupling members 3, 4, permits utilization of a single pattern to form both members and also reduces the number of different parts which a coupling manufacturer is required to carry in stock.

The formation of the power transmitting means or links 5 of spring steel, provides a device in which effective transmission of the power, though the shafts be not in perfect alinement, is permitted and in which the jar resulting from sudden starting or stopping of either the driving or driven element is eliminated. The use of spring steel in the links 5 furthermore eliminates undesirable stretching and deterioration of the links 5 due to their subjection to moisture and also greatly reduces the cost of construction of these links over the cost of leather links as heretofore used. The links 5 may be readily formed in large lots by the use of a simple die. The use of steel links also greatly reduces the necessary size of a coupling due to the correspondingly higher tensile strength of steel over that of leather, this fact permitting the utilization of a smaller link 5 formed of steel to transmit the same power which would require a large leather link for its transmission.

It should furthermore be noted that a coupling as disclosed in this application may be effectively utilized in transmitting power between shafts which are not perfectly alined, and also that the use of a like number of links between each pair of consecutive pivots 8, 9, of the series will permit effective transmission of power in either direction of rotation.

It should be understood that it is not desired to be limited to the exact details of construction shown and described, for obvious modifications will occur to a person skilled in the art.

It is claimed and desired to secure by Letters Patent,—

1. In a coupling, a rotating driving member, a rotatable driven member, and a corrugated spring link having its one end pivotally connected to one of said members and having its opposite end pivotally connected to the other of said members, said link forming a driving connection permitting relative angular displacement of said members.

2. In a coupling, a rotating driving member, a rotatable driven member, a corrugated spring link extending forwardly from said driving to said driven member, and a second corrugated spring link extending rearwardly from said driving to said driven member, said links permitting relative angular displacement of said members during rotation in either direction.

3. In a coupling, a rotating driving member, a rotatable driven member, a series of corrugated spring links located between said members and arranged in a closed circuit with overlapping adjacent ends, and a series of pivots passing through adjacent overlapping link ends, alternate pins of said series being fixed to one of said members and the intermediate pins being fixed to the other of said members, said links forming a driving connection permitting relative angular displacement of said members.

4. In a coupling, a rotating driving shaft, a rotatable driven shaft, and a corrugated metal spring link pivotally connecting said shafts, said link permitting both relative longitudinal and angular displacement of said shafts.

In testimony whereof, the signature of the inventor is affixed hereto in the presence of two witnesses.

WILLIAM H. LIEBER.

Witnesses:
N. M. GUMAER,
H. C. CASE.